United States Patent [19]

Findeisen

[11] E Re. 29,706

[45] Reissued Jul. 25, 1978

[54] HOSIERY SUPPORT

[75] Inventor: Kurt Ernst Findeisen, Spring City, Pa.

[73] Assignee: Findeisen Brothers, Spring City, Pa.

[21] Appl. No.: 807,042

[22] Filed: Jun. 16, 1977

Related U.S. Patent Documents

Reissue of:

[64] Patent No.: 3,965,702
Issued: Jun. 29, 1976
Appl. No.: 413,677
Filed: Nov. 7, 1973

[51] Int. Cl.[2] ..... D04B 9/54; A41B 11/00

[52] U.S. Cl. ..... 66/173; 2/240; 2/335; 66/190

[58] Field of Search ..... 66/178 R, 172 R, 173, 66/172 E, 178 A, 190; 2/240, 255, 256, 257, 258, 259, 260, 261, 262, 263, 264, 303, 320, 335

[56] References Cited

U.S. PATENT DOCUMENTS

| | | | |
|---|---|---|---|
| 2,702,998 | 3/1955 | Purcell | 66/172 E X |
| 2,728,086 | 12/1955 | Aurell | 2/240 |
| 2,994,214 | 8/1961 | Wood, Jr. et al. | 66/178 A |
| 3,194,242 | 7/1965 | Marchisella | 2/258 |
| 3,422,461 | 1/1969 | Froehlich, Jr. | 2/320 |
| 3,800,331 | 4/1974 | Taddeo | 2/240 |

FOREIGN PATENT DOCUMENTS

| | | | |
|---|---|---|---|
| 66,149 | 5/1969 | German Democratic Rep. | 66/173 |
| 420,253 | 10/1925 | Fed. Rep. of Germany | 66/172 R |
| 348,280 | 5/1931 | United Kingdom | 2/240 |
| 389,956 | 3/1933 | United Kingdom | 66/173 |
| 445,387 | 4/1936 | United Kingdom | 66/172 E |

*Primary Examiner*—Louis K. Rimrodt
*Assistant Examiner*—Andrew M. Falik
*Attorney, Agent, or Firm*—Vogel, Dithmar, Stotland, Stratman & Levy

[57] ABSTRACT

A stocking with a stiffening of a portion of its elasticated double welt effected by the insertion of a plastic strip through an opening produced during the knitting of the double welt, said insert being referred to as a hosiery stay, measuring 25% less than the circumference of the welt and worn on the outer side of the leg in relation to the crotch so as to arrest the rolling of the fabric thus maintaining a near maximum area of elastic fabric to contact and grip the leg of the wearer.

2 Claims, 3 Drawing Figures

HOSIERY SUPPORT

Matter enclosed in heavy brackets [ ] appears in the original patent but forms no part of this reissue specification; matter printed in italics indicates the additions made by reissue.

BACKGROUND OF THE INVENTION

This invention relates to stockings with double turned-over tops or welts as produced on circular knitting machines and more particularly to stockings employing elastic yarns in their construction to make them self-sustaining. Hosiery manufactured to-day employing elastic yarn for such purpose are most men's socks, which grip the wearer above the ankle, knee-high stockings which grip the wearer above the calf, and the very popular type known as panty-hose which are held up by the elastic which circles the wearer at the waist.

Stockings, with knit-in elastic to make them self-sustaining, known as the over-the-knee type to lengths as long as those know as thigh-high have never been successfully developed as the problem encountered is that the higher on the wearer the stocking is pulled the greater the girth of the leg and the nature of the welt fabric to roll. This roll which developes as the elasticity in the stocking causes the fabric to roll unto itself as it seeks the lower areas of the leg which are of lesser girth, has only the sustaining power of a narrow garter confining all of its pressure unto a narrow band around the leg. While this pressure may be so great as to cause discomfort it is never-the-less inadequate to properly sustain the stocking.

SUMMARY OF THE INVENTION

The object of my invention is to arrest such rolling of the welt fabric and spread the elasticity knit into these upper portions of the stocking over a greater area of the wearer's leg where its distribution will cause no discomfort to the wearer while its sustaining power will be greater than were it all rolled into a roll thus bagginess at the knee and looseness at the ankle is avoided.

This is not to imply that there is no long stocking except the panty hose, on the market to-day but such long hosiery requires an additional garment to sustain them. A garment most frequently used is the garter belt to which the stocking is fastened, usually by two clips suspended from straps thereon. Also in use is the hosiery garter, a flat elastic band.

My invention utilizes a knit-in elastic thread in the welt and after-welt portion of the stocking over an area greater than a hosiery garter thus distributing its pressure, preventing any discomfort and increasing the ability to sustain the stocking properly.

It is the arresting of rolling of the welt which is the major object of my invention. This is accomplished by stiffening a portion of the welt fabric. I have found that a strip used as an insert slightly wider but approximately of the same length and stiffness as a plastic collar stay to be quite sufficient to arrest rolling. While I have found the best method to retain this stiffening in the welt, which I shall hereafter refer to as a hosiery stay, is the simple insertion of it between the double thickness of the welt fabric. Other means can of course be adapted to stiffen a small area of the tops or welts of stocking and such means should not be construed as deviating from the spirit of my invention.

The upper selvedge of the welt, as on a stocking embodying my invention, will roll a small extent except that portion under which the hosiery stay is located or if the stay should be slightly below the upper selvedge the rolling of the fabric will be arrested by the hosiery stay at that point. Since such stockings should be knit with a very short welt, approximately one inch in length, this roll will be very neglilble. It is the tension of the elastic yarn knit into the welt fabric holding the hosiery stay flat against the leg of the wearer which arrests any rolling which developes in the stocking's welt.

There is on the market today a type of hosiery which has a stiff wide elastic band sewn to the top of the welt. This is a more costly type of hosiery in respect to material and labor involved, also the abrupt ending of the stiff band produces a degree of discomfort which would be greatly deminished were the termination of the topmost selvedge a gentle roll. This discomfort is greatest in the crotch area and in cases where the stocking is worn very high, at the point where the stocking is pulled up against the lower part of the buttock. In this latter area additional discomfort is also encountered when the wearer is in a sitting position. My object is not to prevent the formation of such a roll in the selvedge area of the welt but to arrest it at one point of the selvedge so that it is not circumferentially complete and thus the downward traverse of the rolling is halted. As the size of the hosiery stay is less than 25% of the circumference of the welt this presents a very small area at which the selvedge comes to a sharp end. In FIG. 3 it can be seen that the stay, which is of a resilient material and is free to migrate unrestrained around the welt circumference, occupies less than 25% of the said circumference.

The hosiery stay is best worn slightly forward on the outerside of the leg where it enables the wearer to pull the stocking higher than the crotch. A stocking with a stiff topmost selvedge could not be worn as high as it's limit would be restricted by the crotch.

Those acquainted with the art are familiar with the dial and dial bits which hold the initial sutures formed in the knitting of the welt and the replacement of these sutures onto the needles after the welt fabric has been knit. It is this process which forms the double layer of fabric of the welt. By the simple removal of 5 or 6 adjacent dial bits from the dial a correspondent number of the initial sutures are never picked up and such produces an opening in the lower and inner part of the welt at the point of closure when the picked up structures are transferred from the dial bits to the cylinder needles. After dying and further finishing of the stocking, the hosiery stay is easily inserted.

Other features of the invention will be hereinafter described and claimed.

DETAILED DESCRIPTION OF THE PREFERRED EMBODIMENTS

Figure 1:
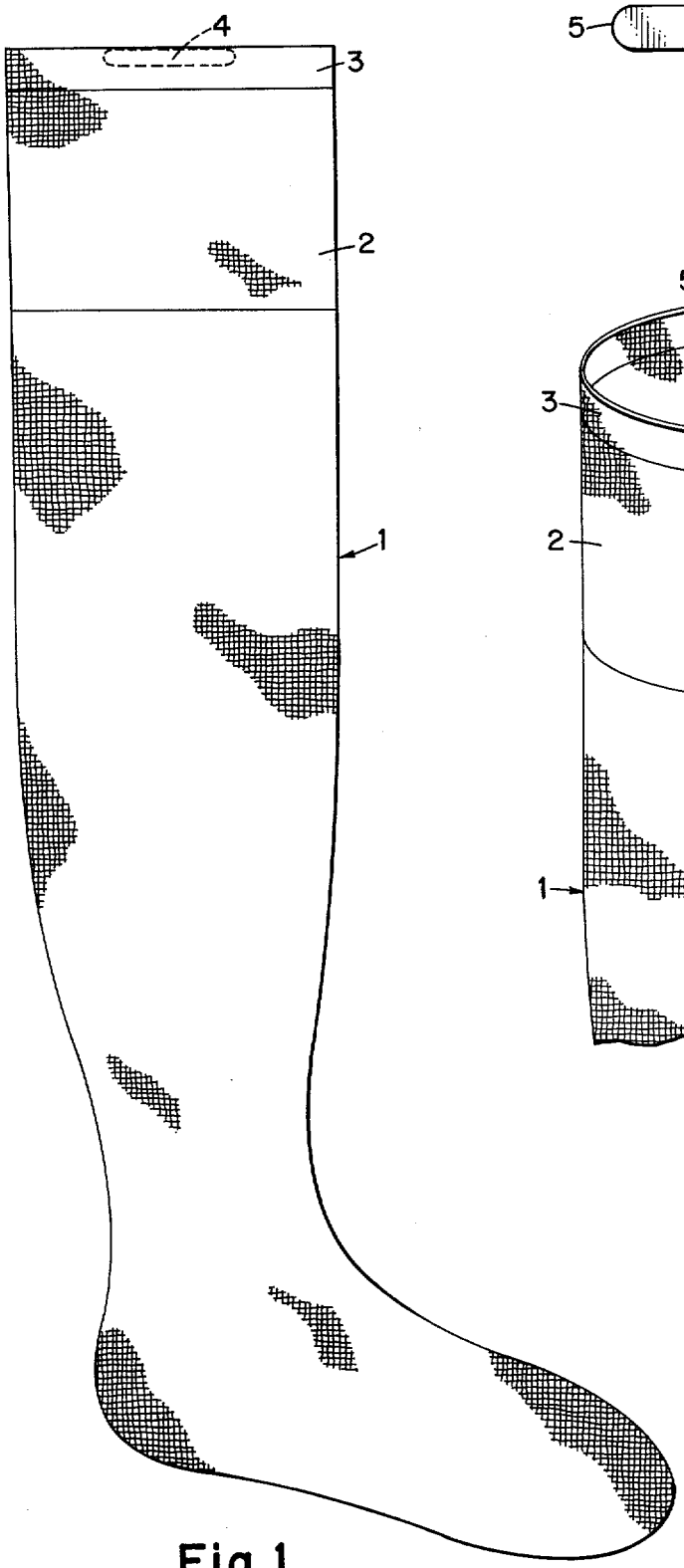
FIG. 1 is a general view of the completed stocking embodying my invention.

Referring to FIG. 1 of the drawing, the numeral 1 designates a leg of a seamless stocking with foot thereon. Also shown are the afterwelt 2, welt 3, and the hosiery stay 4.

Most seamless hosiery produced to-day is knit on either 4 feed or 8 feed machinery. A suitable adaptation of this invention to this type of hosiery would be to knit a welt 3, of about one inch in length and an afterwelt 2, of about 6 inches, FIG. 1. A course of 70 denier spandex or other suitable elastic yarn should comprise every fourth course in the welt 3, and afterwelt 2, of a four feed stocking. A heavier yarn, 140 denier spandex or other suitable elastic yarn should comprise every eighth course of an eight feed stocking. This construction provides sufficient elastic tension to sustain the stocking on the wearer yet it distributes this tension over such a large area of the wearer's leg that no discomfort is encountered by the wearer as would be the case were all this tension confined to a narrow garter.

By citing the aforementioned adaptation I do not mean to infer that this invention is not adaptable to other types of multi-feed hosiery machines such as 3,6, or 12 feed machines.

Figure 2:
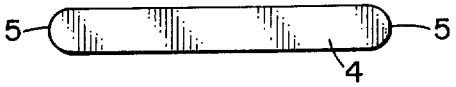
FIG. 2 is a view of the hosiery stay.

The hosiery stay 4, shown in FIG. 2, has rounded ends 5, so that insertion of it at the opening 6, may be easily facilitated.

The opening 6, is formed when the initial knit sutures 7, which have been held by the dial bits, are returned to the needles and are meshed with the course which terminates the welt 3. As mentioned before, a group of adjacent dial bits, 5 or 6 in number, have been removed from the dial of the knitting machine and therefore a group of the initially knit sutures 7, were not meshed with course 8, at the termination of the welt 3, thus forming opening 6.

Figure 3:
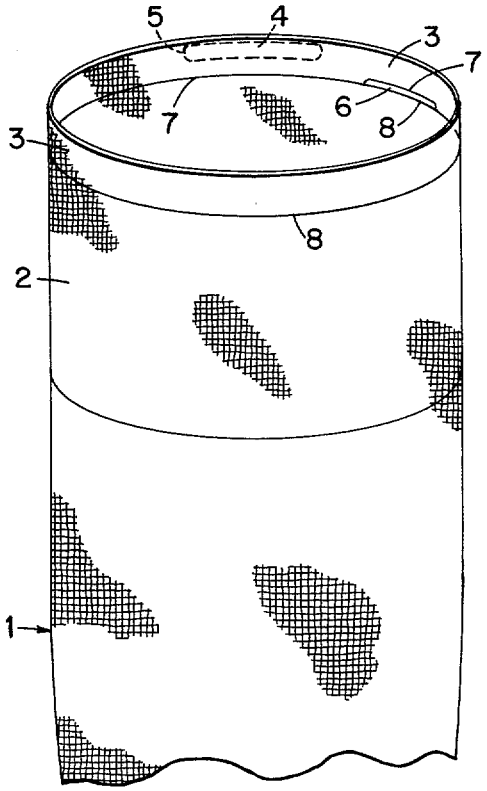
FIG. 3 is a detail view illustrating the construction of the upper portion of a stocking embodying my invention.

As shown on FIG. 3, the hosiery stay 4, is at the upper selvedge of the welt 3. This position is not crucial as it will perform it's function at any area of the welt 3, to which it, through handling may travel. Once the wearer has her foot in the stocking, positioning properly the heel and toe, a slight twisting of the leg portion will position the hosiery stay 4, wherever the wearer may desire. On a very long stocking, the region of the crotch should be avoided as such hosiery can often be pulled higher on the outer side of the leg. It is at this point that the hosiery should be positioned on this longest type of adaptation.

The terms and expressions which I have employed are used as terms of description and not of limitation, and I have no intension, in the use of such terms and expressions, of excluding any equivalents of the features shown and described or portions thereof, but recognize that various modifications are possible within the scope of the invention claimed.

I claim:

1. In a self-sustaining stocking having an elastic yarn knit in selected courses at its open end and having a small welt of double fabric at said end with a natural tendency to roll downwardly on a wearer, a flexible resilient stay positioned within the double fabric of the welt, said stay being of a length which is less than 25% of the *fully extended* circumference of the said welt, said stay being unrestrained within the confines of the said welt such that [is] *it* may migrate circumferentially thereof, said stay preventing circumferentially complete downward rolling of the welt on the wearer.

2. A stocking as set forth in claim 1 wherein said welt is approximately 1 inch in height throughout the circumference thereof.

* * * * *